US006912554B2

(12) United States Patent
Yuasa

(10) Patent No.: US 6,912,554 B2
(45) Date of Patent: Jun. 28, 2005

(54) METHOD AND APPARATUS FOR GARBAGE COLLECTION USING ADVANCED MARKING TECHNIQUES AND RESTRICTED BARRIER TO PROTECT THE DATA

(75) Inventor: Taiichi Yuasa, Kyoto (JP)

(73) Assignee: Omron Corporation, Kyoto (JP)

( * ) Notice: Subject to any disclaimer, the term of this patent is extended or adjusted under 35 U.S.C. 154(b) by 433 days.

(21) Appl. No.: 09/993,382

(22) Filed: Nov. 14, 2001

(65) Prior Publication Data

US 2003/0093397 A1 May 15, 2003

(51) Int. Cl.⁷ .............................................. G06F 17/30
(52) U.S. Cl. ...................................... 707/206; 711/148
(58) Field of Search ........................ 707/206; 711/148, 711/165, 114, 116, 118, 141; 717/141, 114, 116, 118

(56) References Cited

U.S. PATENT DOCUMENTS

| | | | | |
|---|---|---|---|---|
| 4,989,134 A | * | 1/1991 | Shaw | 707/206 |
| 5,845,298 A | * | 12/1998 | O'Connor et al. | 707/206 |
| 5,920,876 A | * | 7/1999 | Ungar et al. | 707/206 |
| 6,101,580 A | * | 8/2000 | Agesen et al. | 711/132 |
| 6,502,111 B1 | * | 12/2002 | Dussud | 707/206 |
| 6,618,738 B2 | * | 9/2003 | Ozawa et al. | 707/206 |
| 2003/0069905 A1 | * | 4/2003 | Dussud | 707/206 |
| 2003/0126352 A1 | * | 7/2003 | Barrett | 711/100 |

OTHER PUBLICATIONS

Yuasa, T, Real–time garbage collection on general–purpose machine, 1990, vol. 11, Issue 3, pp. 181–198.*
Pirinen et al., Barrier techniques for incremental tracing, 1998, pp. 20–25.*
Hosking et al., a comparative performnace evaluation of write barrier implementations, 1992, ACM, pp. 92–109.*
Amsaleg et al., Garbage collection for a client–server persistent object store, ACM, Aug. 1999, vol. 17, No. 3, pp. 153–201.*
Moon et al., Garbage collection in a large lisp system, ACM, 1984, pp. 235–246.*
Zorn et al., Comparing mark–and sweep and stop–and–copy, ACM 1990, pp. 87–98.*

* cited by examiner

Primary Examiner—Luke S Wassum
Assistant Examiner—Leslie Wong
(74) Attorney, Agent, or Firm—Osha & May L.L.P.

(57) ABSTRACT

A method for deleting data, a data deleting apparatus and a recording medium involve a process for deleting unnecessary data generated during the processing of a main program which is created using programming languages which create data dynamically, wherein revisions of the main program are unnecessary and the overhead cost for that process is controlled without losing the real time property of the main program. While the main program is interrupted, the function recording region is scanned and advance marking to identify data for protection is carried out in the data recording region which is directly or indirectly indicated by the pointer which has been recorded in the functional recording region which has been scanned.

6 Claims, 15 Drawing Sheets

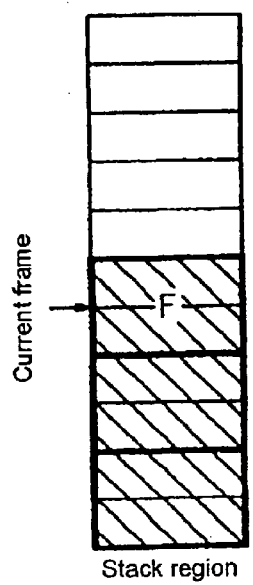 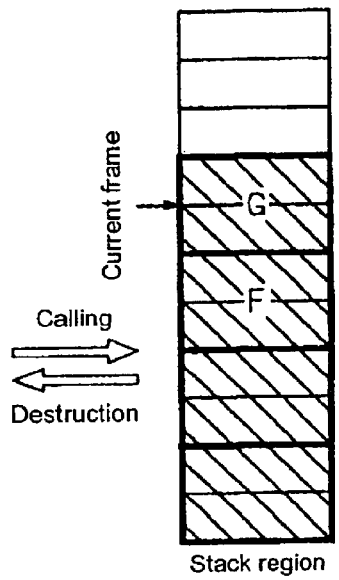 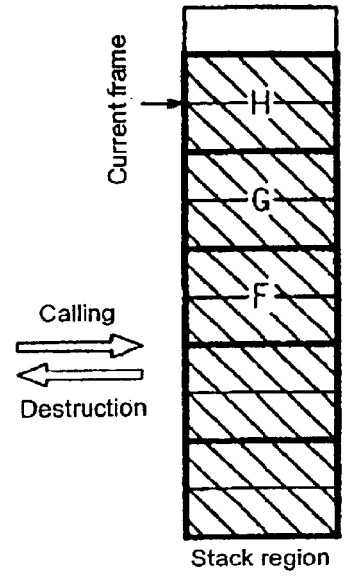
Fig. 10 (a)   Fig. 10 (b)   Fig. 10 (c)
PRIOR ART

PRIOR ART

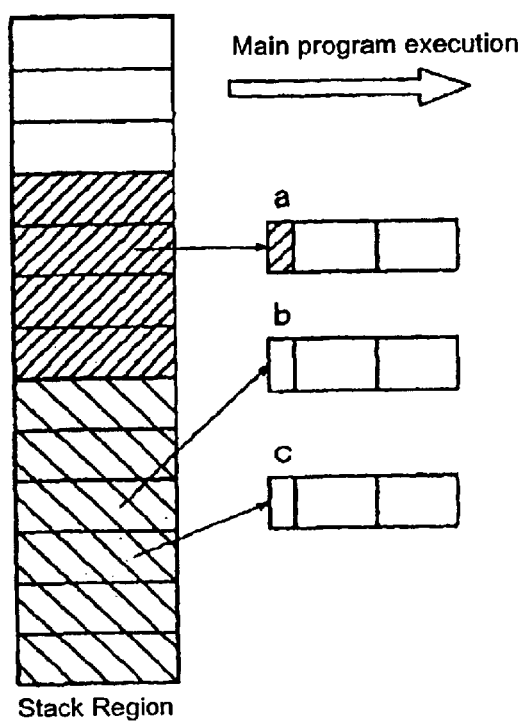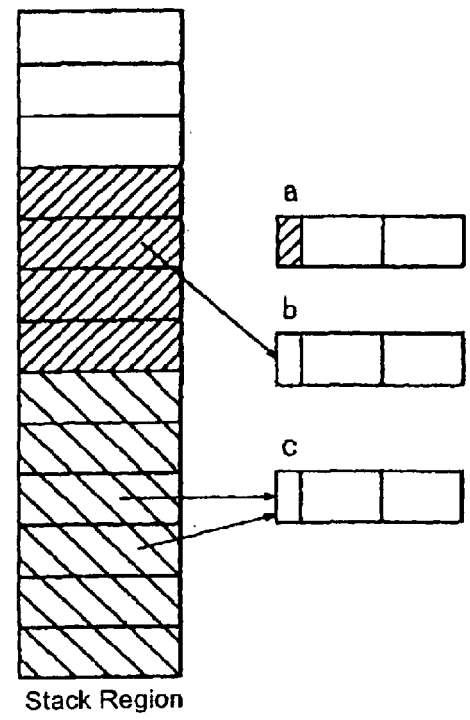
PRIOR ART

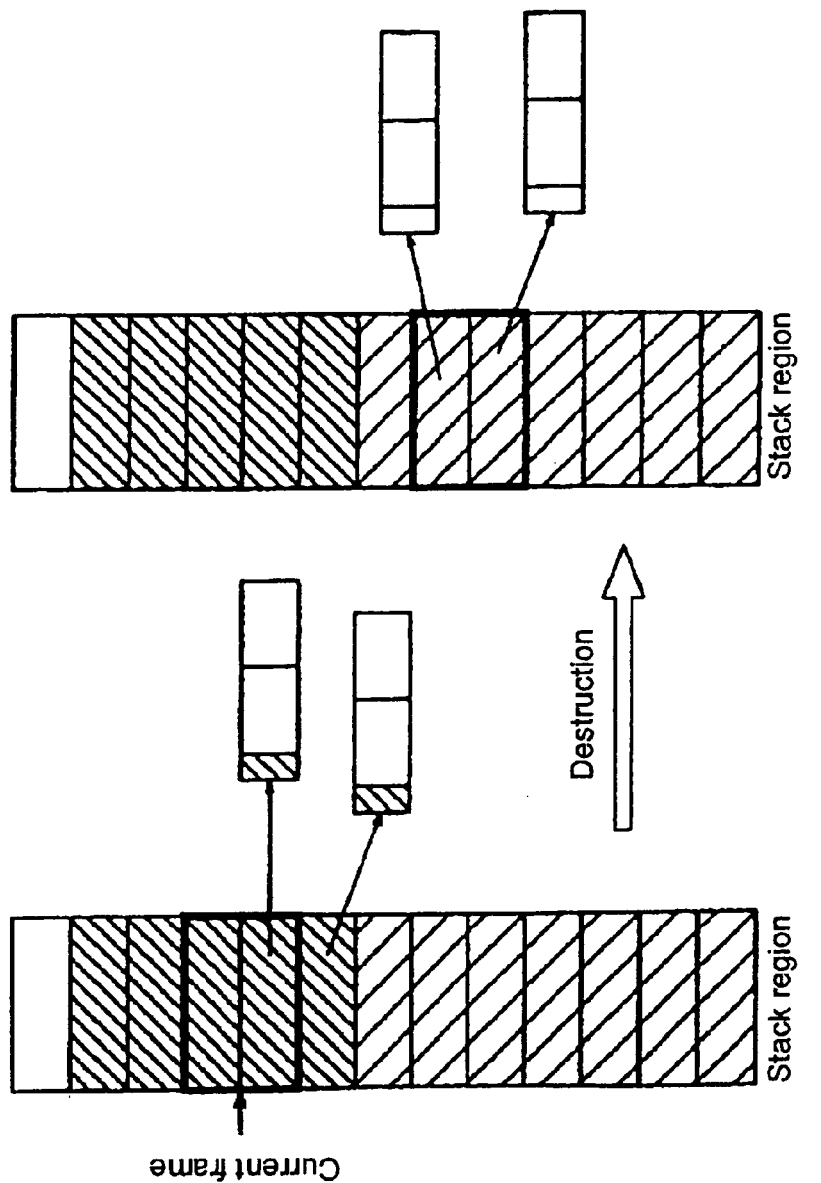

PRIOR ART

PRIOR ART

METHOD AND APPARATUS FOR GARBAGE COLLECTION USING ADVANCED MARKING TECHNIQUES AND RESTRICTED BARRIER TO PROTECT THE DATA

BACKGROUND OF INVENTION

The present invention relates to a method for deleting unnecessary data in which the process of a main program alternates with the scanning of a data recording region having recorded therein data used in carrying out the main program, to data deleting apparatus suitable for this method, and to a recording medium having recorded thereon programs for realizing this apparatus. More particularly, the present invention relates to a data deleting method, a data deleting apparatus, and recording medium for deleting unnecessary data generated in application software programs created using programming languages which create data dynamically, and which are required to be carried out in real time.

In application software programs (referred to as main program hereinafter) created using programming languages which create data dynamically, such as Java, C++, Lisp and Prolog, the data created and used once during processing of the main program sometimes become unnecessary as the main program proceeds.

In view of this, in order to effectively use a data recording region wherein data is recorded, this unnecessary data must be deleted from the data recording region, and after this data is deleted the data region must be reused for recording other data. This process in which data is recorded and then the recording region is reused is called "garbage collection" (referred to as GC hereinafter), and this is a process which is indispensable to the main program.

When the main program for which real time property is of great importance is processed, the GC must be carried out substantially in parallel with the main program, and such methods which have been proposed or actually used include On-the-fly GC, duplicating type incremental GC, and snapshot GC.

On-the-fly GC is a method in which a processor which processes the main program is separately provided from a processor dedicated to the GC program, and both processors are operated in parallel and the GC program can be executed in real time, and this method applies algorithms such as that conceived by Dijkstra in which, while observing the indications of a pointer which indicates data recording region by the main program, marking of the data recording region indicated by the pointed is carried out and the unmarked data in the unnecessary data region is deleted, as well as the algorithm conceived by Steele in which compression processes are used.

The duplicating type incremental GC is a method in which an algorithm designed by Baker is applied. In this method two data recording regions (from space and to space) are secured from the usable recording regions, and only one data recording region (from space) is used to carry out the process of the main program. The usable data which is indicated by the pointer is copied to the other data region (to space) and the data in this other data region is deleted.

However, in both of the On-the-fly GC and the duplicating type incremental GC, large overhead costs are incurred in carrying out the program, and further it becomes necessary to add or secure hardware resources such as processors, recording regions and the like and thus practical application as a general use device was difficult.

As a result, the snapshot GC which was conceived by the Yuasa who is the inventor of the present invention, like Dijkstra, is based on the algorithm in which marking of a data region is carried out and then this data region is deleted, and the object was to simply realize a general use device, and this is widely used at present due to this excellence.

In the snapshot GC, the main program is stopped, a function recording region for the function necessary for process of the main program and a static recording region which determines in advance the locations other than the function recording regions, are scanned. Advance marking (marking in advance) for identifying data for protection in the data recording region which is directly or indirectly indicated by the pointer which has been recorded in the functional recording region which has been scanned is carried out. Further, marking is carried out in order to protect the data in the recording region which has been marked in advance. In addition the method is one in which an algorithm is applied in which data recorded in data recording regions which have not been marked is deleted.

This type of snapshot GC process will be described using the drawings. FIGS. 10A to 10C conceptually illustrate the function recording region for the function which is necessary for executing the main program. The main program is generally carried out when the function is in a called state. As shown in FIGS. 10A, 10B and 10C, the function necessary for the process of the main program calls the function to be executed from among those functions being executed, and a new function region is secured in a stack in the function recording region having the function and which has been secured in the stack region in the memory, and the function which has been called is executed. After the execution of the function is complete, a process is carried out such that the stacked functional recording region which has become unnecessary is destroyed.

The function region for the function being executed (function frame) is called the current frame, and in FIG. 10A the function F is being executed and the function recording region for the function F is the current frame. When the function G which is different from the function F is called, as shown in FIG. 10B, the function recording region for executing the function G is stacked in the stack region and becomes the current frame, and when the execution of the function G is completed, the corresponding function recording region is destroyed and it returns to the state prior to the calling shown in FIG. 10A.

It is to be noted that in FIG. 10B, when yet another function H is called, as shown in FIG. 10C, the function recording region for executing function H is stacked in the stack region and becomes the current frame. When the execution of the function H ends, the corresponding function recording region is eliminated and it returns to the state prior to the calling shown in FIG. 10B.

FIG. 11 is an explanatory chart which conceptually illustrates the scanning and marking process of a conventional method for data deletion (snapshot GC). It is to be noted that in FIG. 11, lines which slant downward to the left illustrate the function recording regions which have been scanned, and the lines which slant downward to the right illustrate the function recording regions which have not been scanned. Scanning of the pointer recorded in the function recording region is carried out from the function recording region at the highest position, toward the function recording region at the lowest position which is the origin function, and advance marking is carried out for the data recording region which is indicated by the pointer which was scanned. Then marking is executed in the data recording region in which advance marking was carried out, and the data recorded in the data recording region which has not been marked is considered unnecessary data and thus deleted.

However, during the snapshot GC process, because there is a small number of recorded pointers in the static recording region, the scanning and the advance marking of the static recording region is completed within a short time, but the scanning and advance marking of the function recording region is not necessarily completed in a short time because the function recording regions which are to be scanned fluctuate.

However, because the snapshot GC interrupts the main program and executes the snapshot GC processes, in order to maintain real time property when carrying out the GC program, the processes related to the GC program must be divided and carried out.

Because the process of executing the scanning and advance marking of the static recording region is completed in a short time, it may be executed while the main program is interrupted and further, even when the process for marking and deleting the data in the data recording region which has been marked in advance is not completed in a short time, because it is possible to divide the processes, neither of these processes cause any big problems.

However, because the scanning and advance marking of function recording region may take a long time, there is the problem that real time property may be lost.

Thus, it may be thought that if the process of scanning and advance marking of function recording region is divided, and each time the program is interrupted, it scanned little by little and the time of each interruption becomes shorter and the real time property of the main program is maintained. However, in this case, process abnormalities such as those exemplified below may be generated.

FIG. 12 is an explanatory chart which conceptually illustrates the scanning and marking process of a conventional method for data deletion (snapshot GC). As in FIG. 11 the lines which slant downward to the left illustrate the function recording region which has been scanned, and the lines which slant downward to the right illustrate the function recording region which has not been scanned. In addition, the state shown in FIG. 12A, the assumption is made that the GC process is interrupted and the main program is executed, and it is then transferred to the state shown in 12B. In the state shown in 12A, the data recording region a has been marked in advance, but the data recording regions b and c are not marked in advance.

The main program is executed from the state shown in FIG. 12A, and in the case where it is transferred to the state in FIG. 12B, the data recording region b is indicated but the function recording region having recorded therein the pointer which indicates the data recording region b is changed from an unscanned function recording region to a scanned function recording region, and when the GC process resumes, because advance marking is not carried out in the data recording region b (because the failure of the advance marking has been generated), the data is not protected and thus deleted. As a result, when due to execution of the main program, the process which requires the data recording region b is executed, because that data has been deleted, processing abnormalities occur.

The following describes the conditions in which this type of failure is generated. FIGS. 13A and 13B are explanatory charts which conceptually illustrates the scanning and marking process of a conventional method for data deletion (snapshot GC). In general, during execution of the function, not all of the function recording regions, but only the function recording region inside of the current frame is referred to.

FIG. 13A shows the state in which the current frame includes the scanned function recording region, and in the case of this state, even if the state of the stack is changed due the process of the main program, because only the scanned function recording region is affected, failure is not generated.

FIG. 13B shows the state in which the current frame includes the unscanned function recording region, and when the stack is changed due to the process of the main program, the pointer which indicates a specific data recording region moves to the scanned function recording region, and thus there is the possibility that failure is generated.

In addition to the processing abnormalities generated in executing the basic processes described above, in the case of a language system which supports local functions, there is the problem that the conditions exemplified below must also be considered.

FIG. 14 is an explanatory chart which conceptually illustrates the scanning of a conventional method for data deletion (snapshot GC). FIG. 14 assumes a simple Common Lisp code in the following, which includes local functions.

```
(defun F(x)
    (labels((G(y z)...(G z y)...))
        (G x x)))
```

That is to say, in the function F, the local function G is defined and from function G, function G itself is called reflexively. Further, the variable x which appears in this reflexive calling system is a parameter which is defined by the function F and it exists in the function recording region F. For this reason, while function G is executed, not only the function recording region of function G, but also the function recording region for function F which is at a position lower than this function recording region is also referred to, and generally this is realized because the function recording region for function G stores a static link which makes it possible to refer to the function recording region for function F. In this case, as shown in FIG. 14, a situation is generated in which the function recording region for function G which has already been scanned is referred to, and then the function recording region for function F which has not been scanned is referred to and this may cause various inconveniences.

Further, there is the problem that the conditions must be considered in which due to unusual processing such as interruption or other intercepting commands while the main program is being executed, or due to general escape, the function to be executed changes from the state of being executed to being a function at a lower position which is to become the return function and one which is not called by the function.

FIGS. 15A and 15B are explanatory charts which conceptually illustrates the scanning of a conventional method for data deletion (snapshot GC). As illustrated in FIG. 15A the condition which is to be considered is, after the execution of function H ends due to unusual processing or due to general escape, during the execution of function H, it is not function G which is called by function H, but rather, as shown in FIG. 15B, the function called throw which executes the function F which is at a lower position than the return function, that is executed.

When throw is executed, the function recording region for the function H has been already scanned, but the situation is sometimes such that the function recording region for the function G and the function recording region for the function F are not scanned, and the problem remains of how to carry out the process of that time and for example whether a language system which supports general escape should be installed.

SUMMARY OF INVENTION

The present invention is achieved in view of this situation and the main objects are to provide a method for deleting data in which, in the case where the scanning and the advance marking of the snapshot GC is interrupted, a barrier is set at the function recording region which has been scanned, and when the function recording region having the barrier is destroyed, the main program causes the scanning and advance marking to be carried out preferentially, and thus the generation of abnormal processing due to failure of the advance marking is prevented; data deleting apparatus for suitably applying this method; and a recording medium having recorded thereon a program which realizes this device.

Further, another object of the present invention is to provide a data deleting apparatus in which the address of the function which is caused to carry out the scanning is set as a barrier thereby controlling the overhead, and in which revision of the main program is unnecessary.

In addition, yet another object of the present invention is to provide a data deleting device and the like in which, in the case of a language system which supports the local functions, when the function which is executed in the function recording region which is to be scanned refers to a function recording region at a lower position, not only the function recording region which does the referring but also the function recording region which is referred to is scanned, and as a result, even if a barrier is set between the function recording region which does the referring and the function recording region which is referred to, for example, generation of processing abnormalities is prevented, and further the function recording regions to be scanned is made substantially less and thus the real time property is not lost.

In addition, yet another object of the present invention is to provide a data deleting apparatus and the like wherein when the throw switches over the function being executed to the function which becomes the return function and which has a lower position than the functions from which it was called, if a barrier is set between the function recording region for the function which is being executed and the function recording region for the function to which the function is returned, by starting scanning of the recording region for the function to which the function is returned, the function recording regions which are to be scanned are substantially less and thus the real time property is not lost, and further, the unscanned function recording region which is between the function recording region for the function which is being executed and the function recording region for the function to which to which that function is returned is never referred to, so even if scanning is not carried out, processing abnormalities are not caused.

The method for deleting data according to a first aspect is one in which a function recording region necessary for executing a function is stacked in a stack region in the memory and the function is executed, and after the execution, the process of the main program for destroying the function recording region is alternated with the deletion of unnecessary unprotected data which is recorded in the data recording region for recording data used in executing the function, wherein: the function recording regions stacked in the stack region are scanned from the upper position side to the low position side, and marking in advance is carried out for protecting the data in the data recording region indicated by the pointer recorded in the function recording region which has been scanned; a barrier is set for restricting the execution of a function at the function recording region at which scanning was last carried out, in the case where scanning of the function recording region is interrupted in order for the process of the main program to be carried out; and scanning is preferentially carried out over destruction when the barrier is set at the function recording region which is to be destroyed after the execution of the function is complete.

In the method for deleting data according to the first aspect, a barrier is set for the function recording region which have been scanned, and when the function recording region having the barrier is destroyed, the scanning and the advance marking is executed with preference over the main program, and thus the function recording region is destroyed and changing of the current frame to the unscanned function recording region is prevented. Thus the generation of failure due to the changes of the pointer based on the process of the main program while scanning is interrupted is prevented, deletion of necessary data is avoided, generation of process abnormalities is prevented, and deletion of unnecessary data which is recorded in the data recording region without loss of real time property, when the main program is executed, is possible.

The method and apparatus for data deletion of a second aspect is one in which a function recording region necessary for executing a function is stacked in a stack region in the memory, and after the execution, the process of the main program for destroying the function recording region is alternated with the deletion of unnecessary unprotected data which is recorded in the data recording region for recording data used to execute the function, wherein the data deleting apparatus includes: a scanning unit for scanning the function recording regions stacked in the stack region from an upper position side to a lower position side, a unit for carrying out advance marking to identify data for protection, in the data recording region indicated by the pointer recorded in the function recording region which has been scanned; a unit for setting a barrier for restricting the execution of a function at the function recording region at which scanning was last carried out, in the case where scanning of the function recording region is interrupted in order for the process of the main program to be carried out; and a unit for preferentially carrying out scanning over destruction of the function recording region when there is a barrier set at the function recording region which is to be destroyed after the execution of the function is complete.

In the data deleting apparatus of the second aspect, a barrier is set at the scanned function recording region and when the function recording region having a barrier is destroyed, the scanning and advance marking is carried out with preference over the process of the main program, and thus when the function recording region is destroyed, the current frame is prevented from being switched to the unscanned function recording region. As a result, generation of failure due to the changes of the pointer based on the process of the main program while scanning is interrupted is prevented, deletion of necessary data is avoided, generation of process abnormalities is prevented, and deletion of unnecessary data which is recorded in the data recording region without loss of real time property is possible when the main program is executed.

The data deleting apparatus of a third aspect is the data deleting apparatus according to the second aspect, wherein the barrier is a unit for calling the function for executing scanning.

In the data deleting apparatus of the third aspect, the address of the function which causes the scanning to be carried out is set as a barrier, and thus revision of the main program for the process which gives preference to scanning over the destruction of the function recording region is unnecessary, and further the overhead for that process is controlled and thus it becomes possible for unnecessary data to be deleted from the data recording region without the real time property being lost at the time the main program process is executed.

The data deleting apparatus according to a fourth aspect is the second or third aspect including a unit for determining whether or not the function of the first function recording region to be scanned refers to a second function recording region which is at a lower position than the first function recording region, and in the case where a determination is made that the second function recording region is being referred to, when the scanning unit scans the first function recording region, the second function recording region is also scanned.

In the data deleting apparatus according to the fourth aspect, in the case where the function which is executed in the first function recording region refers to the second function recording region, when the first function recording region is scanned, the second function recording region is also scanned, and thus even if a barrier is set between the first function recording region and the second function recording region, generation of processing abnormalities is prevented, and further since the function recording regions to be scanned are substantially less, real time property is not lost.

The data deleting apparatus according to a fifth aspect is the data deleting apparatus of the second to fourth aspects, wherein when the function to be executed is returned from the function being executed to a return function which is at a lower position and is different from the function which stacked the function recording region necessary for executing the function, a unit for determining whether or not a barrier is set between the function recording region for the function which is being executed and the function recording region for the return function, and when a determination is made that there is a function recording region having a barrier set, the scanning unit carries out the scanning starting with the function recording region of the return function.

In the data deleting apparatus of the fifth aspect, in the case of a function recording region having a barrier set between the function recording region in which a function is being executed and the function recording region of the return function, since scanning is carried out from the function recording region of the return function, the function recording regions to be scanned can be made substantially less and thus real time property is not lost, and further the function recording region between the function recording region for the function which is being executed and the function recording region of the return function is never referred to and scanning is not carried out and thus processing abnormalities are not generated.

The recording medium which is readable by a computer according to a sixth aspect is one in which a function recording region necessary for executing a function is stacked in a stack region in the memory and then the function is executed, and after the execution, at the computer which executes the main program which destroys the function recording region are recorded, the process of the main program is alternated with the recording of the program which the deletes the unnecessary unprotected data which is recorded in the data recording region for recording data used to execute the function, wherein, the recorded computer program includes: a program code unit in the computer for scanning the function recording region stacked in the stack region from the upper position side to the lower position side; a program code unit in the computer for carrying out advance marking for identifying data for protection in the data recording region indicated by the pointer recorded in the function recording region which has been scanned; a program code unit in the computer for setting a barrier for restricting the execution of a function at the function recording region at which scanning was last carried out, in the case where scanning of the function recording region is interrupted in order for the process of the main program to be carried out; a program code unit in the computer for preferentially carrying out scanning over destruction of the function recording region when there is a barrier set at the function recording region which is to be destroyed after the execution of the function is complete.

In the recording medium which is readable by a computer according to the sixth aspect, the program which is recorded thereon is executed at the computer which processes the main program and thus the computer operates as a device for deleting data. Thus a barrier is set at the function recording region which has been scanned and when the function recording region having the barrier set thereto is destroyed, the scanning and advance marking is carried out with preference over the process of the main program, and thus when the function recording region is destroyed, and the current frame is prevented from being switched to the unscanned function recording region, and thus generation of failure due to the changes of the pointer based on the process of the main program while scanning is interrupted is prevented, deletion of necessary data is avoided, generation of process abnormalities is prevented, deletion of necessary data is avoided, generation of processing abnormalities is prevented, and unnecessary data which is recorded in the data recording region can be deleted without loss of real time property when the main program is processed.

BRIEF DESCRIPTION OF DRAWINGS

FIGS. 10A to 10C are explanatory diagrams for conceptually illustrating a function recording region for a function necessary for executing the main program;

FIGS. 12A and 12B are explanatory diagrams for conceptually illustrating a scanning and marking process of a method for data deletion of the prior art;

FIGS. 13A and 13B are explanatory diagrams for conceptually illustrating a scanning and marking process of a method for data deletion of the prior art;

DETAILED DESCRIPTION

Figure 1:
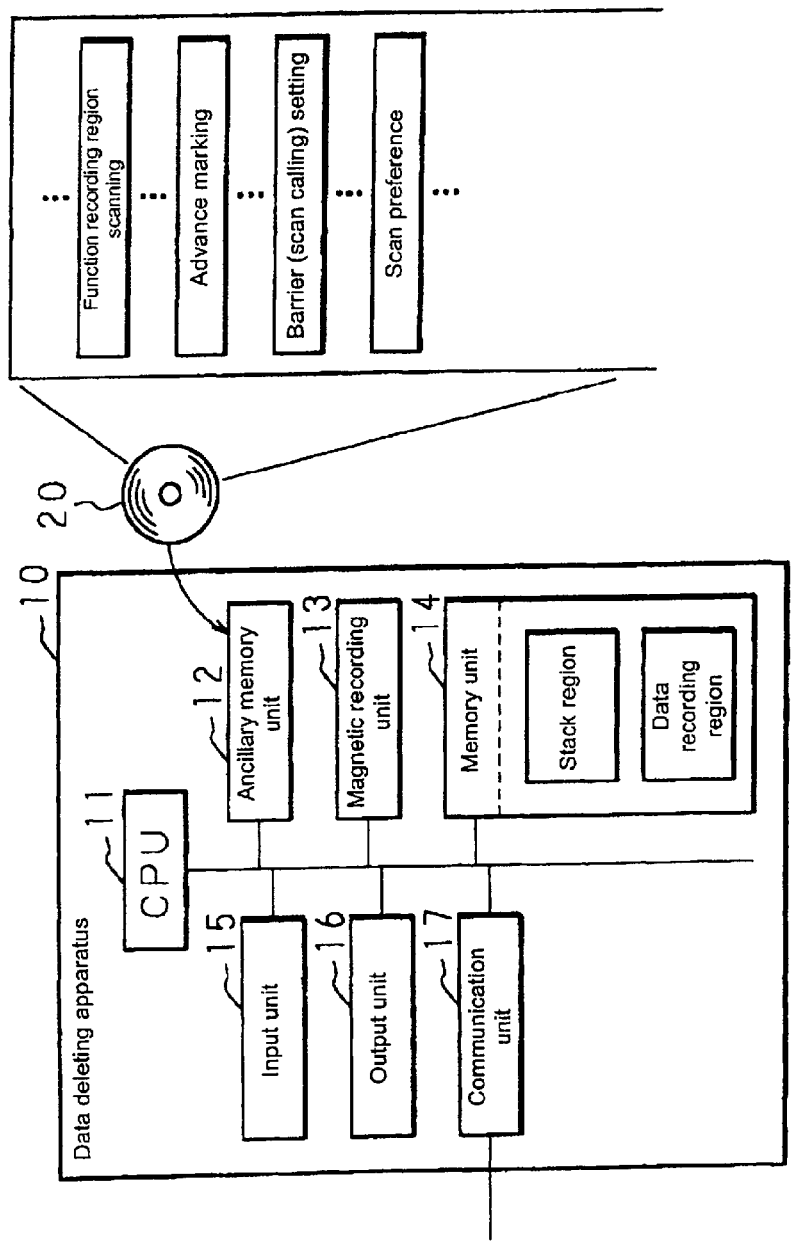
FIG. 1 is a block diagram showing the structure of a data deleting apparatus of the present invention.

The following describes the present invention in detail based on the drawings illustrating embodiments thereof FIG. 1 is a block diagram showing the structure of a data deleting apparatus of the present invention. In this diagram 10 is the data deleting apparatus used in a general use computer of the present invention, and the data deleting apparatus 10 comprises auxiliary recording unit 12 such as a CD-ROM drive or the like which reads information such as programs and data from the recording medium 20 which may be a CD-ROM or the like having information such as programs and data for the data deleting apparatus of the present invention recorded thereon; a magnetic recording unit 13 such as a hard disk and the like for recording information such as programs, data or the like which was read by the auxiliary recording unit 12; and a memory unit 14 for temporarily recording each type of information.

Further, in addition to information such as the programs and the data for the data deleting apparatus of the present invention, a main program which was created using programming languages such as Java, C++, Lisp, Prolog and the like which create data dynamically are recorded on the magnetic recording unit 13. It is to be noted that the program of the present invention may also be recorded as a part of the program for executing the main program.

In addition, information such as programs and data from the magnetic recording unit 13 are read and recorded in the memory unit 14, and by executions in the CPU 11, the general use computer operates as the data deleting apparatus 10 of the present invention.

It is to be noted that a portion of the recording region of the memory unit 14 is used as a stack region for securing the function recording region for the functions necessary for executing the process of main program and the data recording region for recording the data necessary for executing the process of the function.

Further the data deleting apparatus 10 is equipped with input unit 15 such a keyboard and mouse and the like, as well as output unit 16 such a monitor and a printer. In addition, in the case where the main program is, for example a program which controls each of the machines in real time, the data deleting apparatus 10 further comprises a communications unit 17 and is connected via the communications unit 17 to the machines to be controlled.

Figure 2:
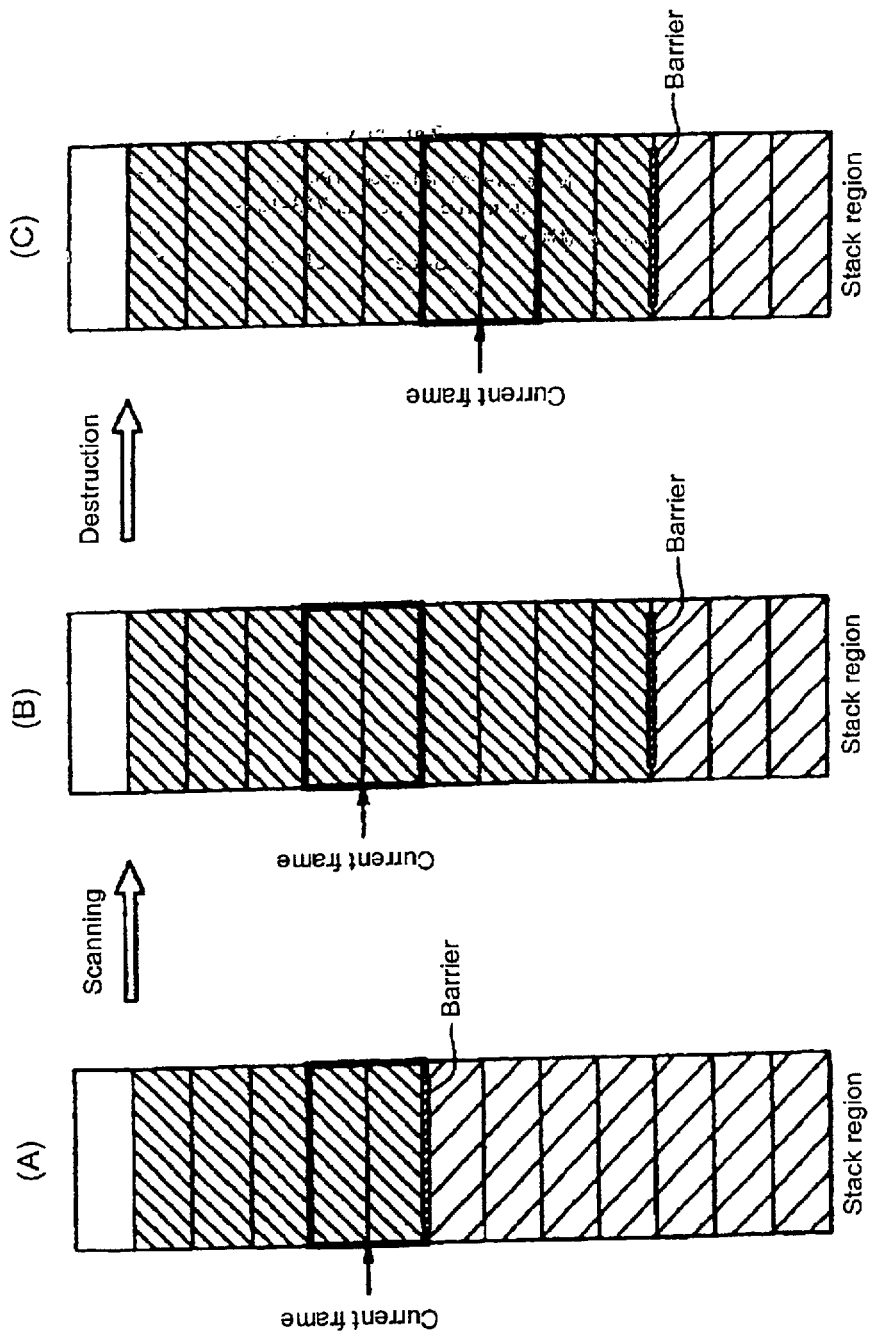
FIGS. 2A to 2C are explanatory diagrams for conceptually illustrating a method for data deletion of the present invention.

Next, the process content of the method for deleting data of the present invention will be described. The method for deleting data of the present invention is a method which applies the snapshot GC of the prior art. FIGS. 2A to 2C are explanatory diagrams for conceptually illustrating a method for data deletion of the present invention. It is to be noted that, in FIGS. 2A to 2C, the portion with the lines which slant downward to the left shows the scanned function recording region while the portion with the lines which slant downward to the right shows the unscanned function recording region, and the portion enclosed in a bold frame is the current frame.

As shown in FIG. 2A, in the method for deleting data of the present invention, when scanning is interrupted, a barrier is set at the function recording region at which scanning was last carried out. This barrier which is set, is set with the purpose of restricting the process of the main program, and in the case where the execution of the function in the current frame is completed and the matching function recording region is destroyed, when a barrier is set at the function recording region which is to be destroyed, as shown in FIG. 2B, the process for destroying the function recording region is interrupted and scanning of the function recording region is temporarily carried out. Thus by the function recording region being destroyed, the switching of the unscanned stack region to the current frame is prevented, and after the scanning is complete, as shown in 2C, destruction of the matching function recording region is carried out and the current frame is switched.

The barrier set in this manner gives preference to the scanning process over the process of destroying the function recording region which is one of the processes of the main program, and a result, failure of the advance marking which is carried out along with the scanning can be prevented.

Figure 3:
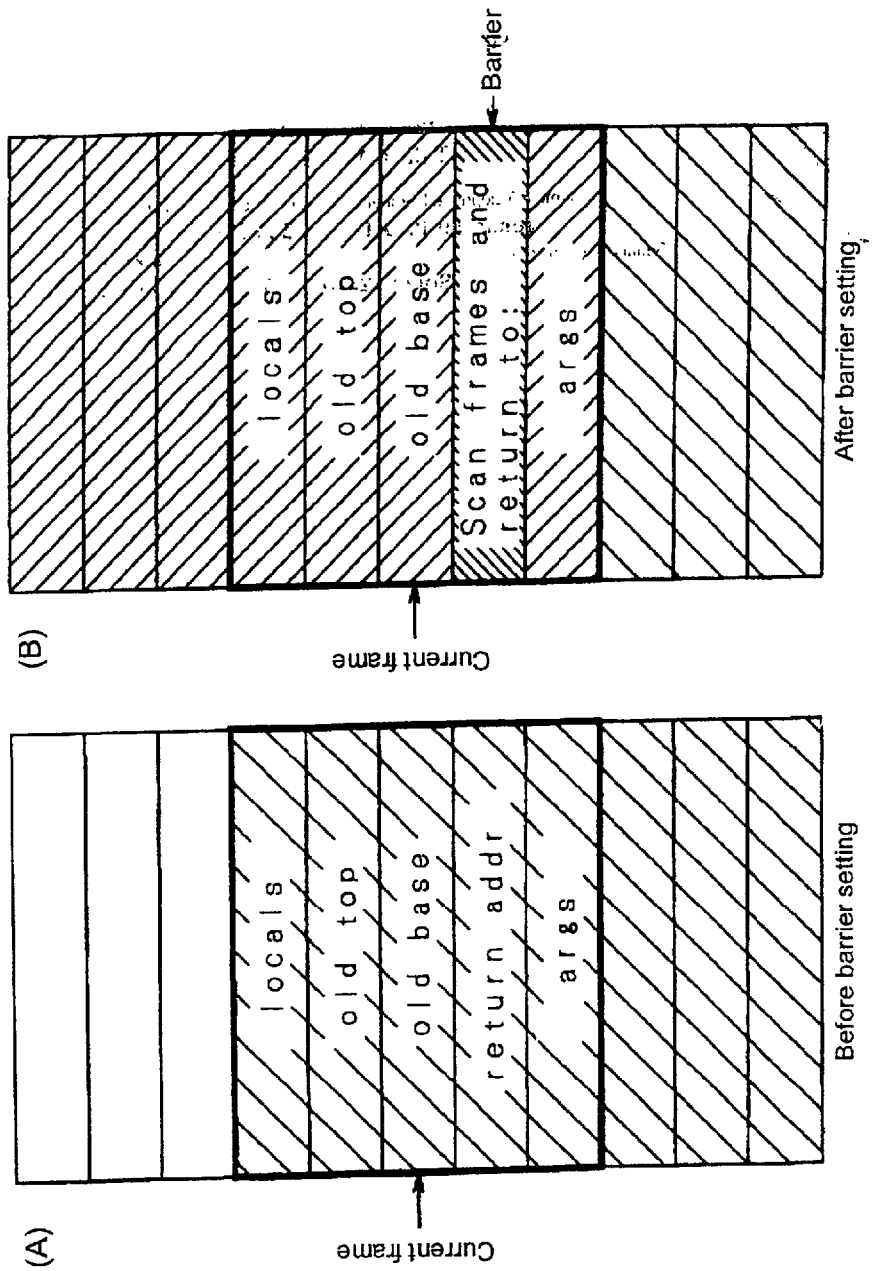
FIGS. 3A and 3B are explanatory diagrams for conceptually illustrating a barrier in a method for data deletion of the present invention.

FIGS. 3A and 3B are explanatory diagrams for conceptually illustrating the barrier in a method for data deletion of the present invention. FIG. 3A shows groups of data included in the function of the current frame before the barrier is set. FIG. 3B shows groups of data included in the function of the current frame having the barrier set.

In the method for deleting data of the present invention, as shown in FIGS. 3A and 3B, the return address (return addr) in the data group included in the function is replaced by the address of the function which is carried out preferentially over the scanning (Scan frames and return to:) and thus is a barrier which controls the execution of the main program. It is to noted that process for eliminating the barrier is carried out by making the replaced address to the original address once again.

For this reason the operation of changing the main program or the like is unnecessary, and further because a process such as one for detecting the existence of a barrier is unnecessary, generation of overhead can be controlled.

Figure 4:
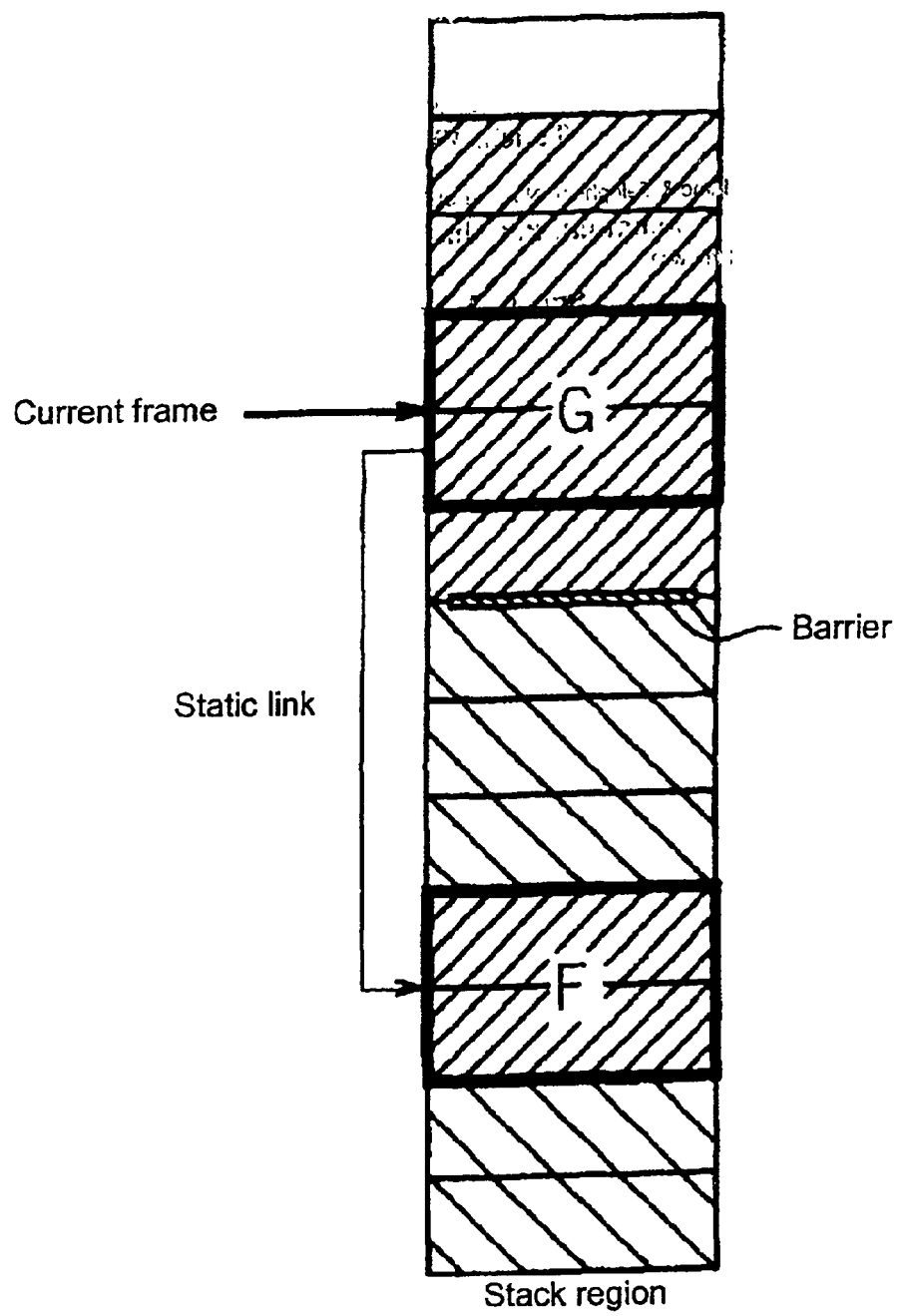
FIG. 4 is an explanatory diagram for conceptually illustrating a method for data deletion of the present invention.

FIG. 4 is an explanatory diagram for conceptually illustrating a method for data deletion of the present invention. FIG. 4 illustrates the case in which the function executed by the main program is a local function including the following Common Lisp code.

```
(defun F(x)
    (labels((G(y z)....(G z y)...))
        (G x x)))
```

That is to say, in the function F, the local function G is defined and the function G itself is reflexively called from the function G, and also the variable x which appears in the reflexive calling system is a parameter which is defined by the function F and it exists in the function recording region for the function F. For this reason, while this function G is being executed, not only the function recording region for the function G, but also the function recording region for the function F which has a lower position than this function recording region is also referred to, and a static link which makes if possible to refer to the function recording region of the function F is stored in the function recording region of the function G.

In the present invention, in order for language system which supports the local functions to be usable, in the case where the function recording region for function G which is shown in FIG. 4 is scanned, a determination is made as to whether or not the function G is referring to the function recording region at a lower position which executes function F, and if a determination is made that it is referring to the function recording region at a lower position, when the function recording region for function G is scanned, a function recording region at a lower position which executed the function F is also scanned. At this time, the scanning of the function recording region which is between the function recording region for the function G and the function recording region for the function F, is carried out after the scanning of the function recording region of the function F. It is to be noted that in a case where a function recording region of an even lower position than the function F is being referred to, scanning is carried out for that function recording region also.

Figure 5:
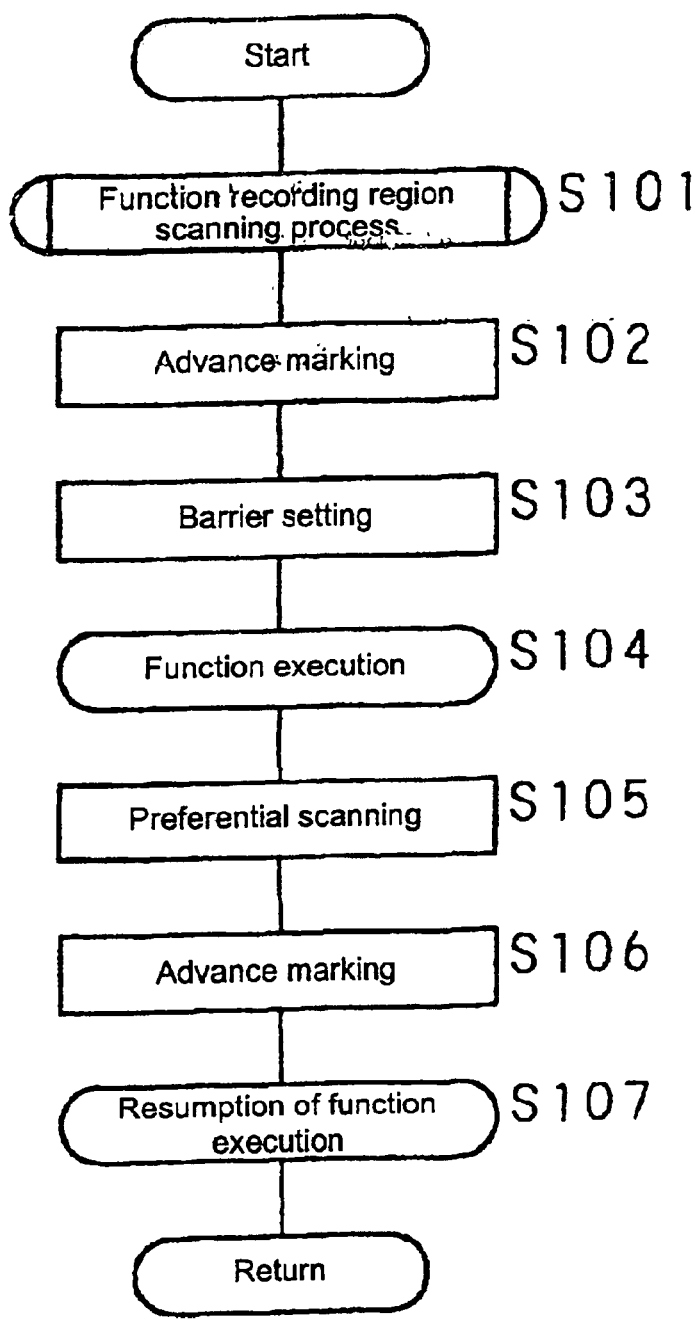
FIG. 5 is a flowchart for illustrating the process steps in a method for data deletion of the present invention.

Next, the process steps of the method for data deletion of the present invention will be described using the flowcharts of FIGS. 5, 6 and 7. In the data deletion apparatus 10, the process for the function of the main program is carried out alternately with the process for deleting unnecessary data. The process steps for deleting data are: while the main program is interrupted, the function recording region which is stacked in the stack region carries out the process of scanning from the high position side to the low position side (S101); and the pointer recorded in the function recording region which has been scanned carries out advance marking for identification of data for protection in the data recording region which has been indicated directly or indirectly (S102).

Figure 6:
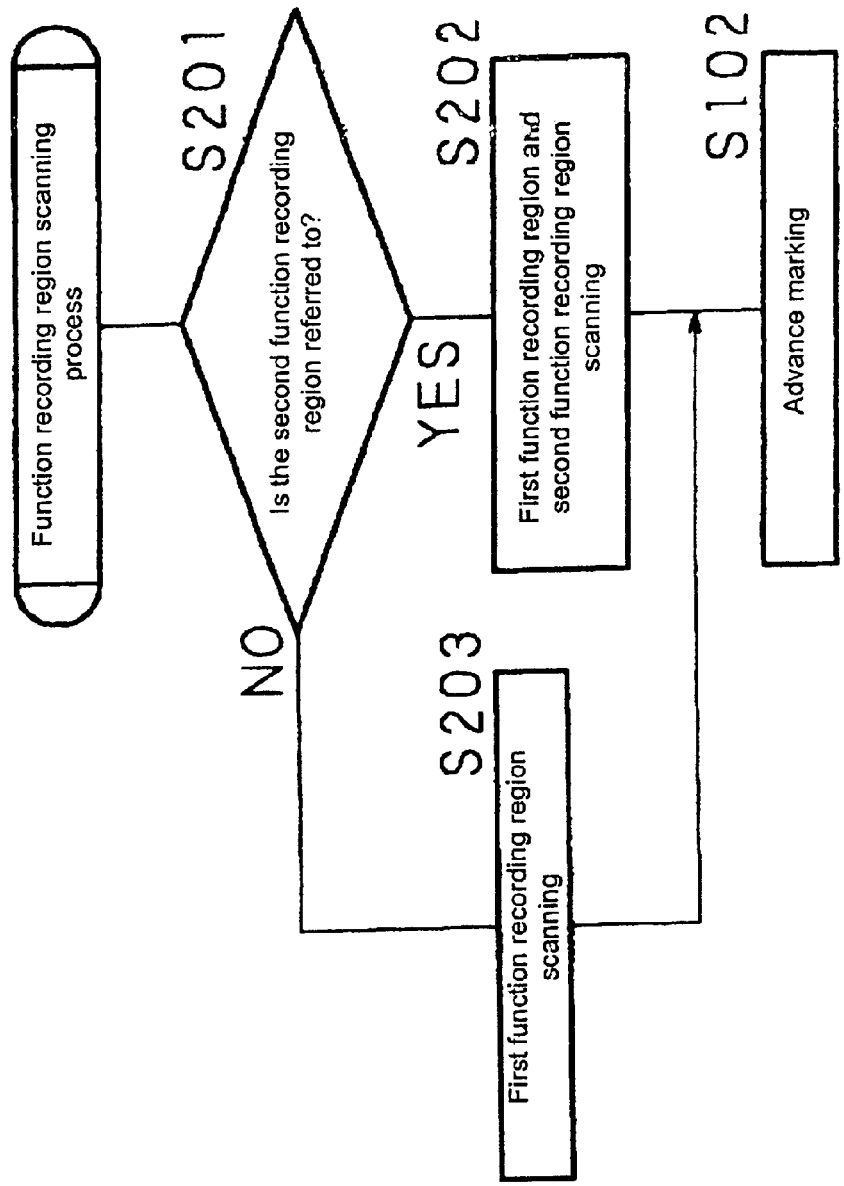
FIG. 6 is a flowchart of the process steps in a method for data deletion of the present invention.

It is to be noted that as explained using FIG. 4, in the case where the main program can be used in a language system which supports local functions, in the scanning process of the function recording region in step 101, as shown in FIG. 6, the process for determining whether or not a region for reference exists is carried out by a static link. That is to say, the function executed in the function recording region to be scanned (referred to as the first function recording region hereinafter) determines whether the function recording region which is at a lower position than the first function recording region (referred to as the second function recording region hereinafter) is being referred to (S201), and in the case where a determination is made that the second function recording region is being referred to (S201: YES), the process of scanning the function recording region in step 101 includes scanning of not only the first function recording region, but also the second function recording region (S202). Then, the process proceeds to step 102 and the advance marking is carried out. It is to be noted that the function which is executed at what is called the first function recording region here, is equivalent to the function G in FIG. 4, and the function executed in the second function recording region is equivalent to the function F in FIG. 4.

Also, in step S201, in the case where the determination is made that reference is not being made to the second function recording region, (S201:NO) the scanning process of the function recording region in Step 101, is the scanning of only the first function recording region (S203), and the process proceeds to step S102 and the advance marking process is carried out.

Then, in the case where the processes of step S102 and step 103 are interrupted and the process of the main program is to be resumed, a barrier is set which controls the execution of the function in the function recording region in which scanning was carried out last.

After the barrier is set, in the case where the function of the main program is executed (S104), and the current frame is switched to the function recording region having the barrier set, when the execution of the function is terminated and the matching function recording region is destroyed, the scanning process takes preference over the destruction process (S105), or the scanning is carried out together with the advance marking (S106). It is to be noted that at this time also, it goes without saying that in the case where the main program uses a language system which supports local functions, the process illustrated in FIG. 6 is carried out. Further, the function is executed, that is to say, the destruction of the function recording region is started once again (S107).

In addition, in the process of steps S105 to S107, specifically as shown in FIG. 3B, after the scanning (and the advance marking) is executed, in order to call the function for executing the function of the main program, control is switched to the address set as the barrier.

Figure 7:
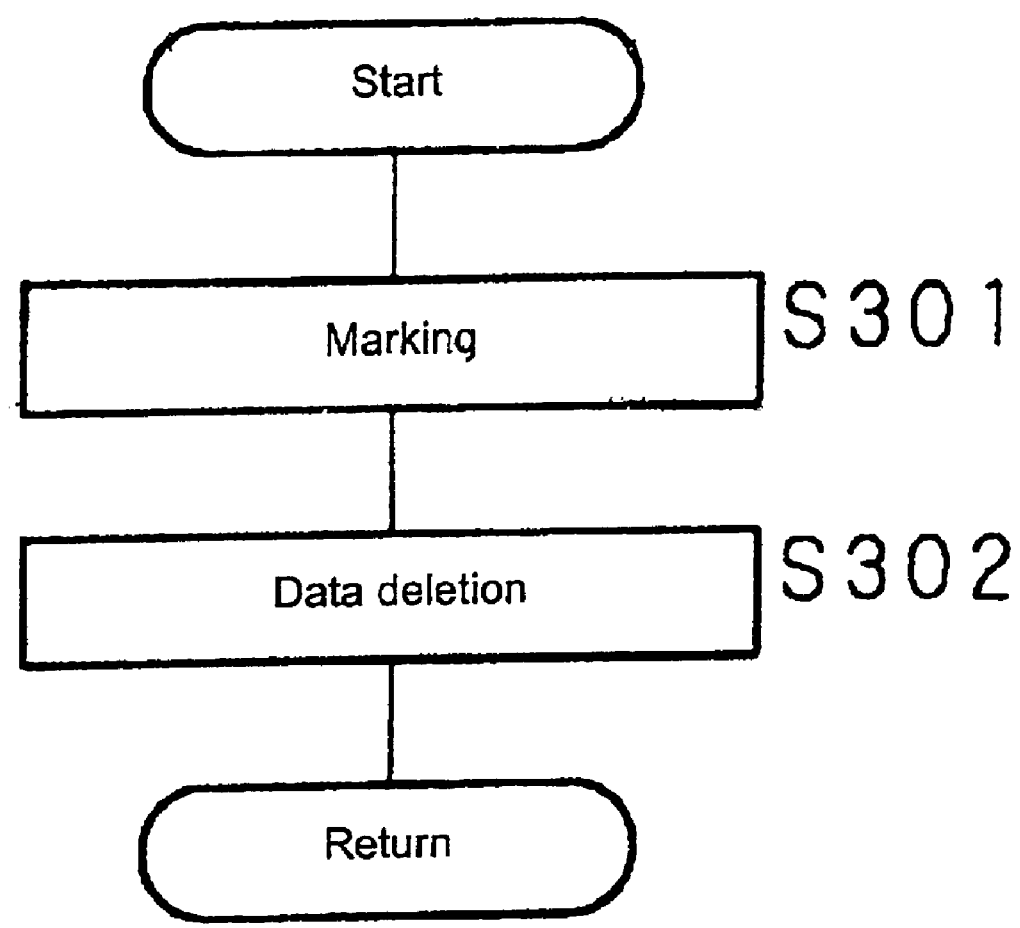
FIG. 7 is a flowchart showing the process steps in a method for data deletion of the present invention.

Then after the scanning is complete, while the main program is interrupted, as shown in FIG. 7, as the program for deleting unnecessary data, the marking is carried out for the data recording region which was marked in advance (S301), and the data recording region which was not marked is deleted (S302).

Next in the method for deleting data of the present invention, the process is described for the case where, a situation is generated in which due to unusual processing such as interruption or other intercepting commands while the main program is being executed, or due general escape, the function which to be executed becomes the return function for a function being executed, which function is at a lower position. An example is, a process to be applied in the case where a language system which supports general escape is usable.

Figure 8:
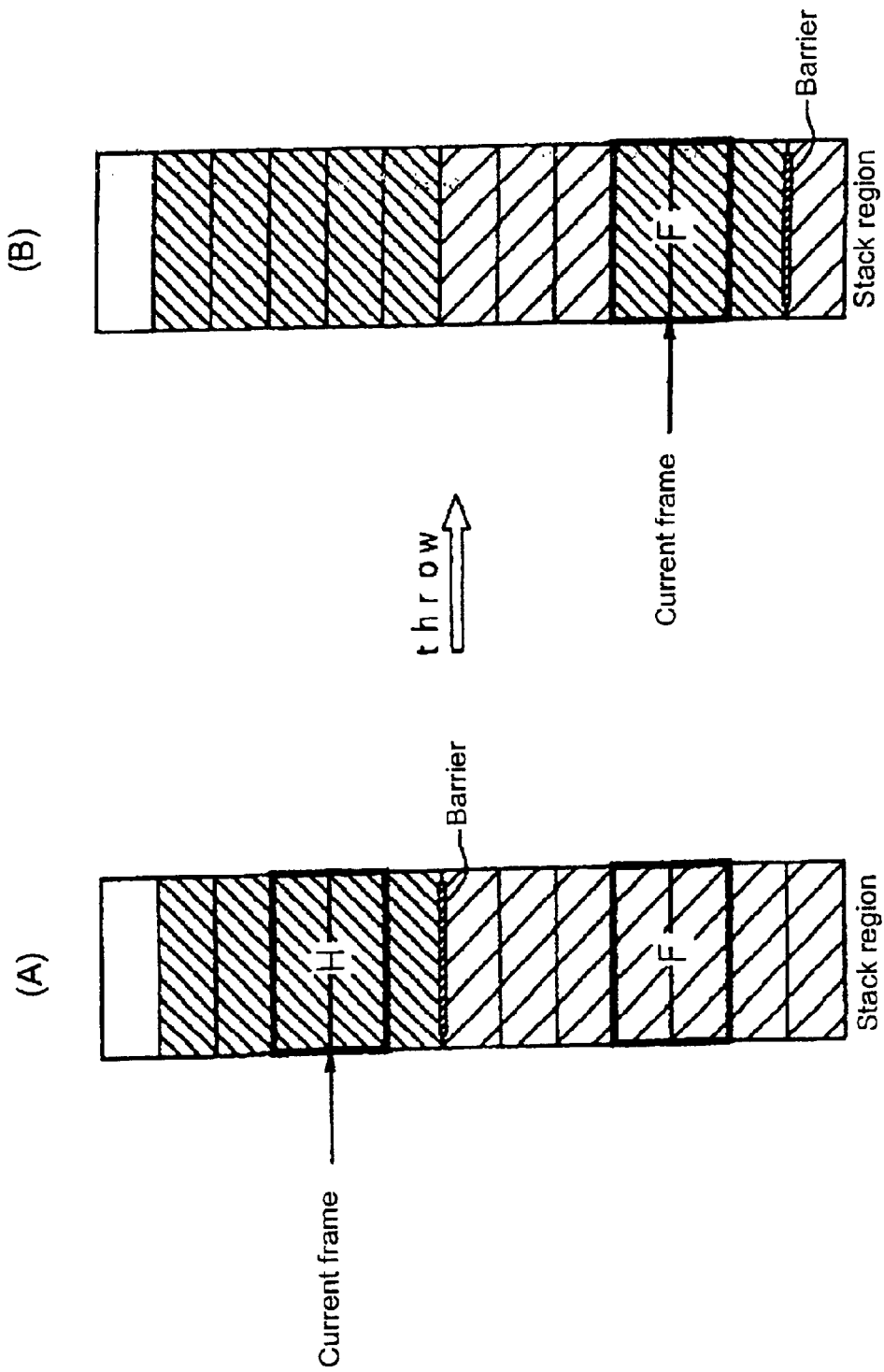
FIGS. 8A and 8B are explanatory diagrams for conceptually illustrating a method for data deletion of the present invention.

FIGS. 8A and 8B are explanatory diagrams for conceptually illustrating a method for data deletion of the present invention. In FIGS. 8A and 8B, by the general escape being executed from the state shown in FIG. 8A in which the function H is being executed, after the execution of function H is complete, as shown in FIG. 8B the state is shown in which the function called throw is executed as the function to where the function F which is at a lower position than the function called by the function H is returned.

In the present invention, in order for the language system which supports the general escape to be usable, as shown in FIGS. 8A and 8B, in the case where the function F to which a function is returned is at a lower position and different from the function which stacks the function recording region of the function H which is being executed, when there is a function recording region having a barrier set thereto between the function recording region of the function H which is being executed, and the function recording region of the function F to which it is returned, the set barrier is removed and the scanning of the function recording region to which it is returned is resumed, and advance marking and barrier setting is carried out.

For this reason, a function recording region which is not scanned is generated between the function recording region which executed the function H and the function recording region which executed the function F, and the data of the data recording region which is indicated directly or indirectly by the pointer recorded in this function recording region is deleted because it is not marked in advance, but since this data is never referred to abnormal processes are not caused.

Figure 9:
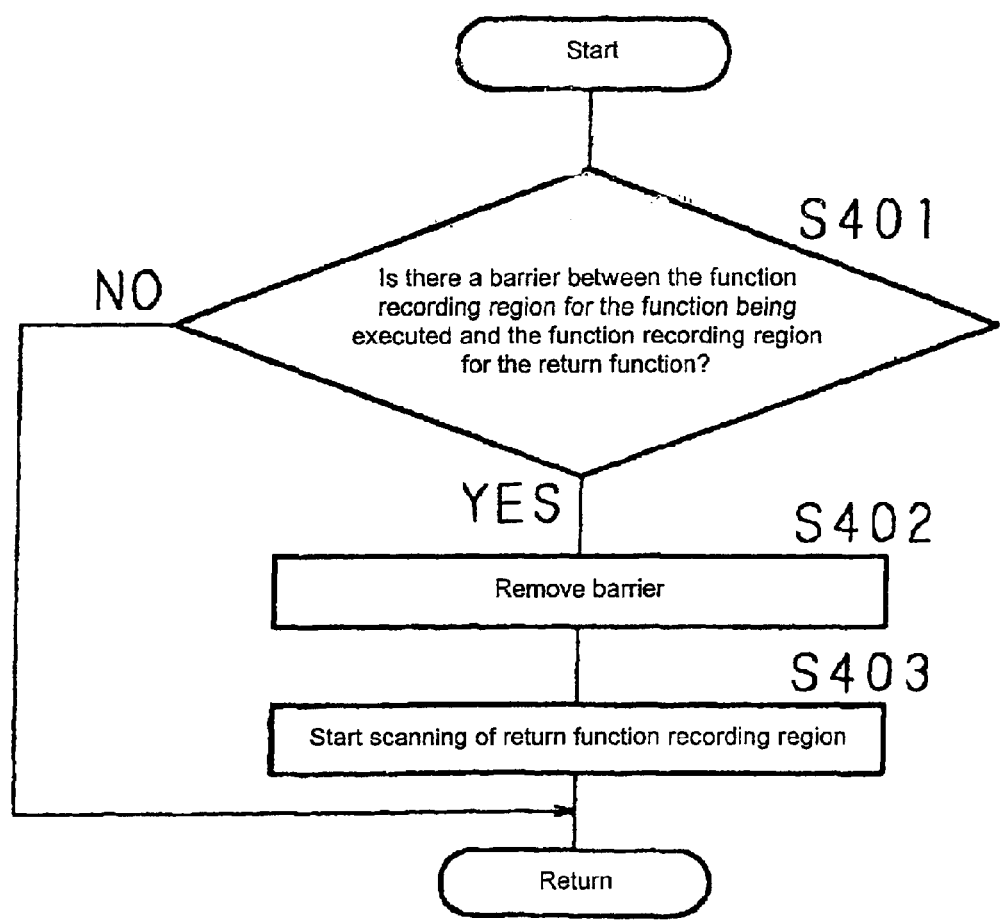
FIG. 9 is a flowchart showing the process steps in a method for data deletion of the present invention.
Figure 11:
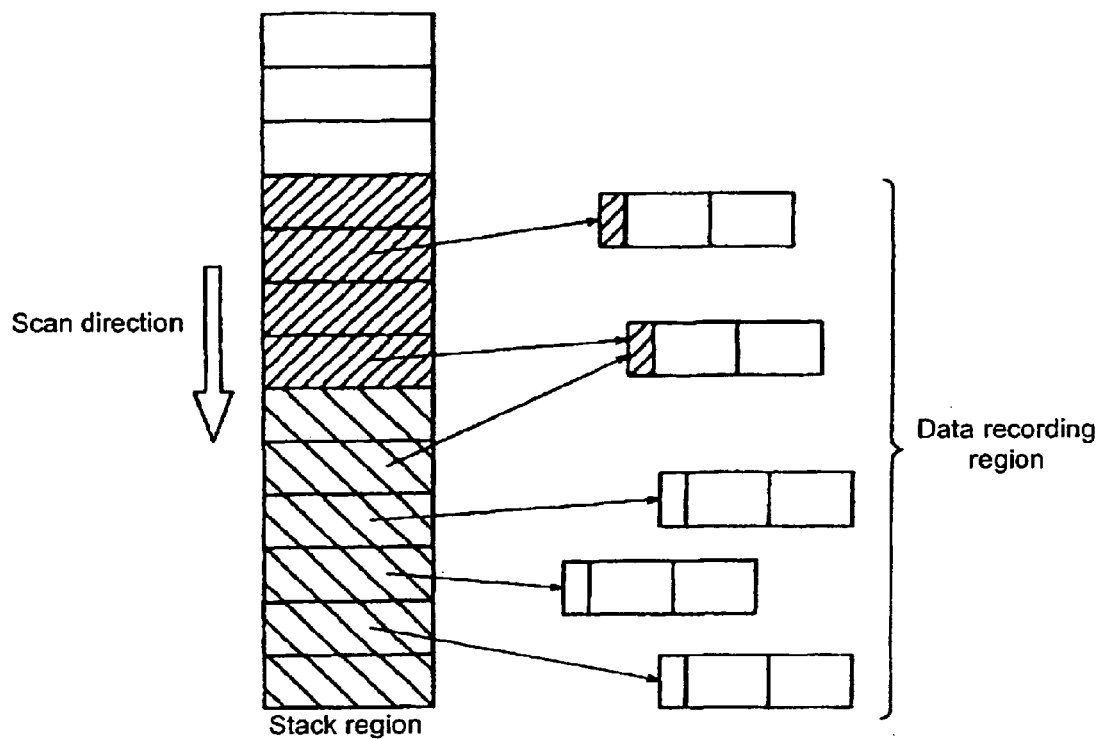
FIG. 11 is an explanatory diagram for conceptually illustrating a scanning and marking process of a method for data deletion of the prior art.
Figure 14:
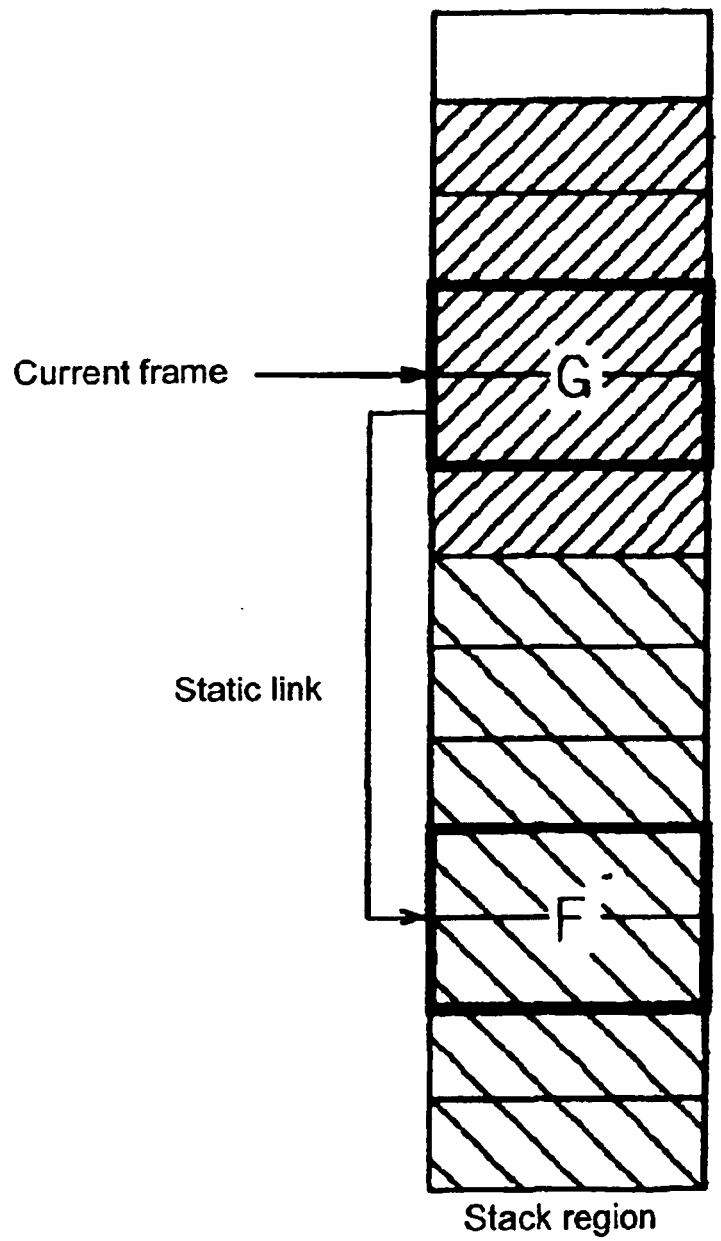
FIG. 14 is an explanatory diagram for conceptually illustrating a scanning process of a method for data deletion of the prior art.
Figure 15:
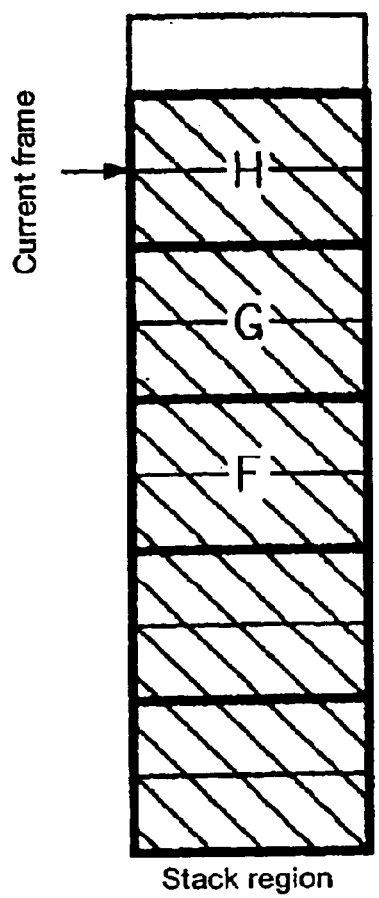
FIGS. 15A and 15B are explanatory diagrams for conceptually illustrating a scanning process of a method for data deletion of the prior art.
Figure 15:
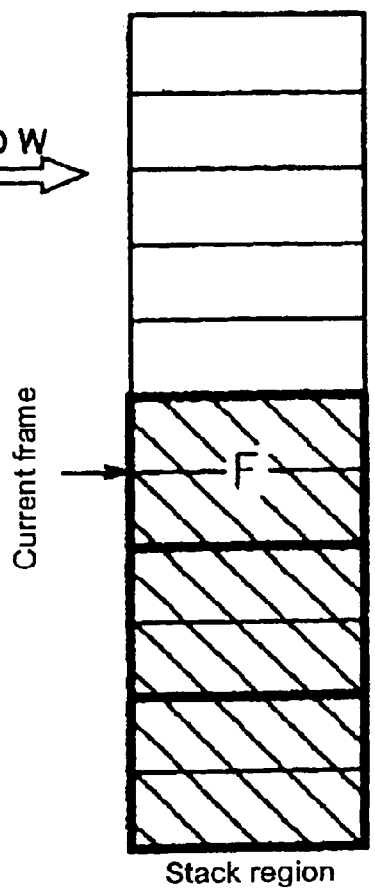

Next the process steps of the method for deleting data of the present invention are described using the flowchart shown in FIG. 9.

In the data deleting apparatus 10, in the case where general escape is carried out, firstly a process for searching for the return function is carried out from the function recording region for the first function, to the function recording region at the lower position. At this time along with the process of searching for the return function, it is determined as to whether or not there is a function recording region having a barrier. Then in a case where a determination is made that there is a function recording region having a barrier between the function recording region in which the function is being executed and the function recording region for the return function (S401: YES) the set barrier is removed (S402), and scanning, advance marking and barrier setting for the function recording region for the return function is started (S403).

In the case where in step 401, a determination is made that there is no function recording region having a barrier between the function recording region in which the function is being executed and the function recording region for the return function (S401: NO) since this unit the function recording region for the return function has already been scanned, the processes of S402 and S403 are not carried out.

In this embodiment, each of the devices is connected to the data deletion apparatus of the present invention which is a general use computer so that they controlled in real time. However, the present invention is not limited thereto, and the present invention may be suitably programmed so as to be applied to a microcomputer for control which is equipped with each of the devices for which real time property is required.

As described in detail above, in the method for deleting data, the data deleting apparatus and the recording medium of the present invention, the process of the method for deleting data has a main program created using programming languages such as Java, C++, Lisp, Prolog and the like which create data dynamically, and this main program is carried out alternately with a process for deleting unnecessary data. In the process of this method for deleting data, a barrier is set at the function recording region which has been scanned, and when the function recording region having the barrier set is destroyed, the scanning and advance marking is preferentially carried out over the execution of the main program, and thus when the function recording region is destroyed, the current frame is prevented from being switched to the unscanned function recording region. Thus advance marking failure which is generated due to the changes of the pointer based on the execution of the main program while scanning is interrupted is prevented, deletion of necessary data is avoided, generation of process abnormalities is prevented, and deletion of unnecessary data which is recorded in the data recording region without loss of real time property at the time of execution of the main program is possible, and other excellent effects can be obtained.

Further in the present invention, the address of the function which causes the scanning to be carried out is set as a barrier, and thus revision of the main program for the process which gives preference to scanning over the destruction of the function recording region is unnecessary, and further the overhead cost for that process is controlled and thus it becomes possible for unnecessary data to be deleted from the data recording region without real time property being lost at the time of execution of the main program.

In addition in the present invention, in the case of a language system which supports the local functions, when the function which are executed in the function recording regions which are to be scanned refers to a function recording region at a lower position, not only the function recording region which does referring but also the function recording region which is referred to is scanned, and as a result, even if a barrier is set, for example, between the function recording region which does referring and the function recording region which is referred to, generation of processing abnormalities is prevented, and further the amount of function recording region which is to be scanned is made substantially less and thus the real time property is not lost, as well as other excellent effects are obtained.

In addition, when the throw is executed, which throw switches the function which it executes from a function being executed to a function at a lower position which did not call that function, and which will become the return function, if a barrier is set between the function recording region for the function which is being executed and the function recording region for the function to which the function is returned, by starting scanning from the recording region for the return, the function recording region which are to be scanned is made substantially less and thus the real operation is not lost, and further, the unscanned function recording region which is between the function recording region for the function which is being executed and the function recording region for the function to which for the return function is never referred to, so even if scanning is not carried out, processing abnormalities are not caused, and other excellent effects are obtained.

What is claimed is:

1. A method for deleting data in which a function recording region necessary for executing a function is stacked in a stack region in the memory and the function is executed, and after the execution, the process of the main program for destroying the function recording region alternates with the deletion of unnecessary unprotected data which is recorded in the data recording region for recording data used in executing the function, wherein:

the function recording regions stacked in the stack region are scanned from the upper position side to the low position side, and marking in advance is carried out for protecting the data in the data recording region indicated by the pointer recorded in the function recording region which has been scanned;

a barrier is set for restricting the execution of a function at the function recording region at which scanning was last carried out, in the case where scanning of the function recording region is interrupted in order for the process of the main program to be carried out; and scanning is preferentially carried out over destruction when the barrier is set at the function recording region which is to be destroyed after the execution of the function is complete.

2. A data deleting apparatus in which a function recording region necessary for executing a function is stacked in a stack region in the memory, and after the execution, the process of the main program for destroying the function recording region is alternated with the deletion of unnecessary unprotected data which is recorded in the data recording region for recording data used to execute the function, wherein the data deleting apparatus comprises:

scanning means for scanning the function recording regions stacked in the stack region from an upper position side to a lower position side, means for carrying out advance marking to identify data for protection in the data recording region indicated by the pointer recorded in the function recording region which has been scanned;

means for setting a barrier for restricting the execution of a function at the function recording region at which scanning was last carried out, in the case where scanning of the function recording region is interrupted in order for the process of the main program to be carried out; and means for preferentially carrying out scanning over destruction of the function recording region when there is a barrier set at the function recording region which is to be destroyed after the execution of the function is complete.

3. The data deleting apparatus according to claim 2, wherein the barrier is means for calling the function for executing scanning.

4. The data deleting apparatus according to claim 2 or 3, comprising means for determining whether or not the function of the first function recording region to be scanned refers to a second function recording region which is at a lower position than the first function recording region, and in the case where a determination is made that the second function recording region is being referred to, when the scanning means scans the first function recording region, the second function recording region is also scanned.

5. The data deleting apparatus according to any of claims 2 to 3, wherein when the function to be executed is returned from the function being executed to a return function which is at a lower position and is different from the function which stacked the function recording region necessary for executing the function, a means for determining whether or not a barrier is set between the function recording region for the function which is being executed and the function recording region for the return function, and when a determination is made that there is a function recording region having a barrier set, the scanning means carries out the scanning starting with the function recording region of the return function.

6. A recording medium which is readable at a computer in which a function recording region necessary for executing a function is stacked in a stack region in the memory and then the function is executed, and after the execution, at the computer which executes the main program which destroys the function recording region are recorded, the process of the main program alternates with the program which the deletes the unnecessary unprotected data which is recorded in the data recording region for recording data used to execute the function, wherein, the recorded computer program comprises:

program code means in the computer for scanning the function recording region stacked in the stack region from the upper position side to the lower position side;

program code means in the computer for carrying out advance marking for identifying data for protection in the data recording region indicated by the pointer recorded in the function recording region which has been scanned;

program code means in the computer for setting a barrier for restricting the execution of a function at the function recording region at which scanning was last carried out, in the case where scanning of the function recording region is interrupted in order for the process of the main program to be carried out; and program code means in the computer for preferentially carrying out scanning over destruction of the function recording region when there is a barrier set at the function recording region which is to be destroyed after the execution of the function is complete.

* * * * *